(12) United States Patent
Park

(10) Patent No.: US 7,424,381 B2
(45) Date of Patent: Sep. 9, 2008

(54) APPARATUS AND METHOD OF ESTIMATING THE QUALITY OF INPUT SIGNAL, AND OPTICAL DISC DRIVER

(75) Inventor: Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/706,340

(22) Filed: Feb. 15, 2007

(65) Prior Publication Data

US 2007/0189132 A1 Aug. 16, 2007

(30) Foreign Application Priority Data

Feb. 15, 2006 (KR) ............ 10-2006-0014732
Jan. 15, 2007 (KR) ............ 10-2007-0004404

(51) Int. Cl.
*G01R 29/26* (2006.01)
(52) U.S. Cl. .................................................. 702/69
(58) Field of Classification Search .......... 702/69, 702/75, 79, 189
See application file for complete search history.

(56) References Cited

U.S. PATENT DOCUMENTS

| | | | |
|---|---|---|---|
| 4,783,807 A | * | 11/1988 | Marley ............... 704/235 |
| 6,611,794 B1 | * | 8/2003 | Fleming-Dahl ............... 702/191 |
| 2003/0043939 A1 | | 3/2003 | Okumura et al. |
| 2003/0046037 A1 | | 3/2003 | Mashimo |
| 2004/0264307 A1 | | 12/2004 | Wilhelmsson |
| 2005/0041537 A1 | | 2/2005 | Tanaka et al. |

OTHER PUBLICATIONS

PCT International Search Report and Written Opinion mailed Apr. 30, 2007 re: International Application No. PCT/KR2007/000805 (10 pp).

* cited by examiner

*Primary Examiner*—Bryan Bui
(74) *Attorney, Agent, or Firm*—Stein, McEwen & Bui, LLP

(57) ABSTRACT

An apparatus and method of estimating the quality of an input signal, and an optical disc driver including the apparatus for estimating the quality of the input signal, the signal quality estimating apparatus including a level value detection unit that detects level values of an input signal according to a binary signal of the input signal, an input signal composing unit that composes a plurality of ideal input signals by using the level values and a plurality of pre-defined binary signals, and a quality calculation unit that obtains a quality of the input signal according to a calculation between the plurality of ideal input signals.

29 Claims, 14 Drawing Sheets

APPARATUS AND METHOD OF ESTIMATING THE QUALITY OF INPUT SIGNAL, AND OPTICAL DISC DRIVER

CROSS-REFERENCE TO RELATED APPLICATIONS

This application claims the benefit of Korean Patent Application No. 2006-14732, filed on Feb. 15, 2006, and Korean Patent Application No. 2007-4404, filed on Jan. 15, 2007, in the Korean Intellectual Property Office, the disclosure of which is incorporated herein by reference.

BACKGROUND OF THE INVENTION

1. Field of the Invention

Aspects of the present invention relate to an apparatus and method of estimating the quality of an input signal, and an optical disc driver including the apparatus for estimating the quality of an input signal.

2. Description of the Related Art

An input signal is an analog signal, such as a radio frequency (RF) signal, that is reproduced from a storage medium. For example, a disc is a storage medium that stores a binary signal, though an RF signal read from the disc has the properties of an analog signal due to the characteristics of the disc and the optical characteristics of an optical disc driver driving the disc. Hence, the optical disc driver may perform a binarization process to change the RF signal to a binary signal. A binarization process may be performed using a comparator 100 as illustrated in FIG. 1.

FIG. 1 is a functional block diagram illustrating a general binarization process. Referring to FIG. 1, the general binarization process is performed using the comparator 100 and a low-pass filter 110. The comparator 100 compares an input RF signal with a slicing level and outputs the result of the comparison. The input RF signal is read from a disc. The output of the comparator 100 is simultaneously transmitted to the low-pass filter 110 and another processing unit (not shown). The low-pass filter 110 low-pass filters the output of the comparator 100. An output of the low-pass filter 110 is transmitted as the slicing level to the comparator 100.

An existing optical disc driver converts the RF signal read from the disc into a binary signal using the binarization process illustrated in FIG. 1, makes a system clock by applying the binary signal to a phase locked loop, and plays back data read from the disc using the binary signal and the system clock. There is a slight difference, or a jitter, between the phases of the RF signal and the system clock.

FIGS. 2A through 2C illustrate a jitter generated between an offset-removed RF signal and a system clock based on a falling edge of the system clock. In FIGS. 2A through 2C, in an ideal case, a falling edge of the system clock precisely meets a zero crossover point of the RF signal. However, in actuality, the falling edge of the system clock does not precisely meet the zero crossover point of the RF signal, and there is a slight temporal difference between them. This difference is referred to as a jitter.

In an existing technique, a jitter corresponding to the difference between the RF signal and the system clock is used to estimate the quality of the RF signal. In other words, in an ideal case, a jitter is hardly measured because an edge of the system clock precisely meets a zero crossover point of the RF signal. However, when the RF signal is affected by noise or abnormal circumstances, the edge of the system clock is not precisely overlapped by the zero crossing point of the RF signal, and the jitter is therefore measured. Thus, the quality of the RF signal can be estimated based on the measured jitter value.

However, as the recording density of a disc increases, the magnitude of an RF signal corresponding to a binary signal with a short T (where T denotes one pit interval) decreases. Accordingly, even when a small amount of noise is added to the RF signal corresponding to a binary signal with a short period, the RF signal is relatively greatly distorted or the RF signal is near the zero crossing point. Consequently, a wrong jitter value may be measured. Therefore, it the qualities of RF signals read out from high-density discs cannot be estimated by using jitter values measured based on the differences between the RF signals and system clocks.

SUMMARY OF THE INVENTION

Aspects of the present invention provide an apparatus and method of precisely estimating the quality of an input signal (or a reproducing signal or a radio frequency (RF) signal) regardless of the recording density of a disc, and an optical disc driver including the apparatus.

Aspects of the present invention also provide an apparatus and method of estimating the quality of an input signal by using both a level value of the input signal that is obtained based on a relationship between the input signal and a binary signal of the input signal and an ideal input signal based on a pre-determined binary signal, and an optical disc driver including the apparatus.

According to an aspect of the present invention, there is provided a signal quality estimating apparatus including: a level value detection unit to detect level values of an input signal according to a binary signal of the input signal; an input signal composing unit to compose a plurality of ideal input signals by using the level values and a plurality of pre-defined binary signals; and a quality calculation unit to obtain a quality of the input signal according to a calculation between the plurality of ideal input signals.

According to another aspect of the present invention, there is provided an optical disc driver including a signal quality estimating apparatus to estimate a quality of an input signal reproduced from an optical disc by using the input signal, a binary signal of the input signal, and a plurality of pre-defined binary signals; and a system control unit to correct a focusing location by finely adjusting a focus offset according to the estimated quality of the input signal.

According to another aspect of the present invention, there is provided an optical disc driver including: a signal quality estimating apparatus to estimate a quality of an input signal reproduced from an optical disc by using the input signal, a binary signal of the input signal, and a plurality of pre-defined binary signals; and a system control unit to finely adjust a tilting correction according to the estimated quality of the input signal.

According to another aspect of the present invention, there is provided an optical disc driver including: a signal quality estimating apparatus to estimate a quality of an input signal reproduced from an optical disc by using the input signal, a binary signal of the input signal, and a plurality of pre-defined binary signals; and a system control unit to finely adjust a detracking offset while varying the detracting offset according to the estimated quality of the input signal.

According to another aspect of the present invention, there is provide an optical disc driver including: a signal quality estimating apparatus to estimate a quality of an input signal reproduced from an optical disc by using the input signal, a binary signal of the input signal, and a plurality of pre-defined binary signals; and a system control unit to finely adjust conditions for recording data to the optical disc while varying the recording conditions according to the estimated quality of the input signal.

According to another aspect of the present invention, there is provided a signal quality estimating method including: detecting level values of an input signal according to a binary signal of the input signal; composing a plurality of ideal input signals by using the level values and a plurality of pre-defined binary signals; and obtaining a quality of the input signal according to a calculation between the plurality of ideal input signals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
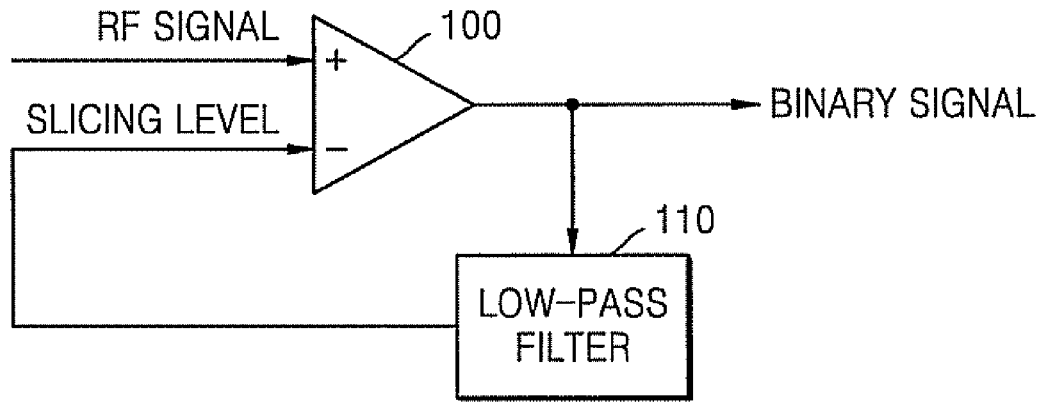
FIG. 1 is a functional block diagram illustrating a general binarization process.
Figure 2A:
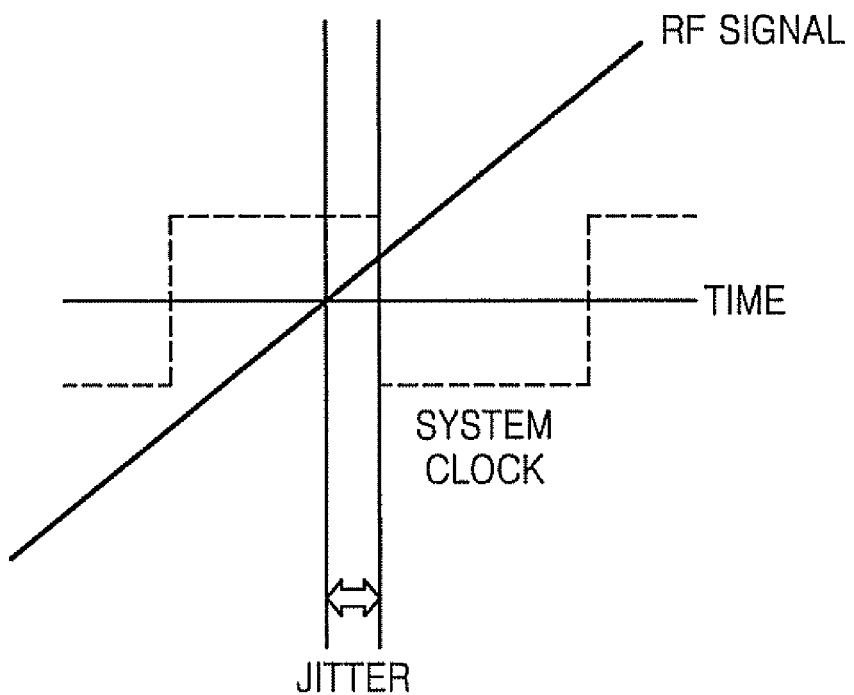
FIGS. 2A through 2C illustrate a jitter generated between an offset-removed RF signal and a system clock.
Figure 2B:
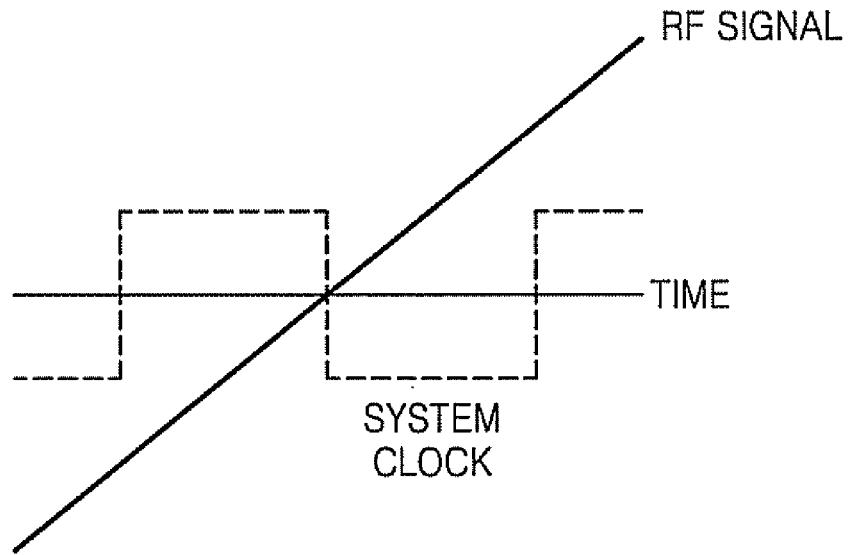
Figure 2C:
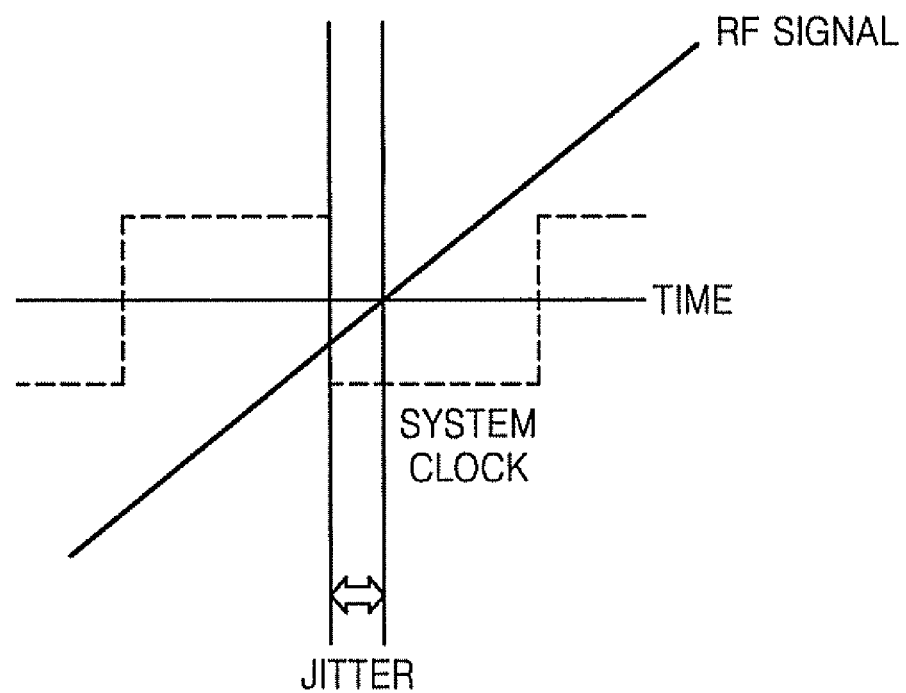

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
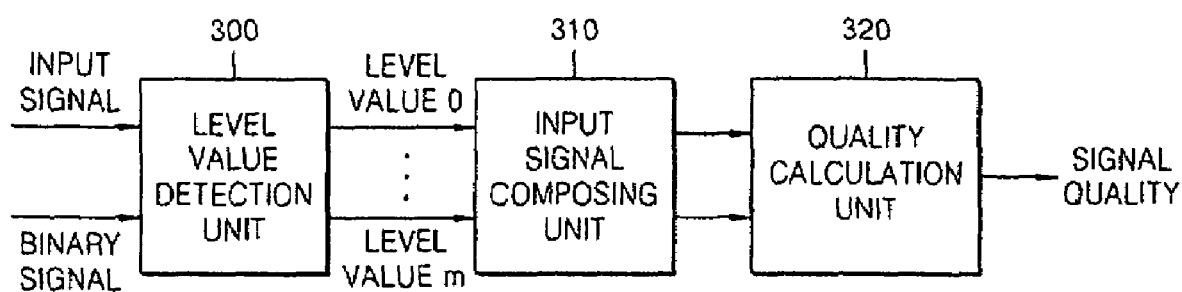
FIG. 3 is a functional block diagram of an input signal quality estimating apparatus according to an embodiment of the present invention.

FIG. 3 is a functional block diagram of an input signal quality estimating apparatus according to an embodiment of the present invention. Referring to FIG. 3, the input signal quality estimating apparatus includes a level value detection unit 300, an input signal composing unit 310, and a quality calculation unit 320.

The level value detection unit 300 detects level values of an input signal by using a binary signal of the input signal. Hereinafter, the binary signal of the input signal is referred to as just a binary signal. The detected level value may be defined as a level value that represents the state of a current channel.

Figure 4:
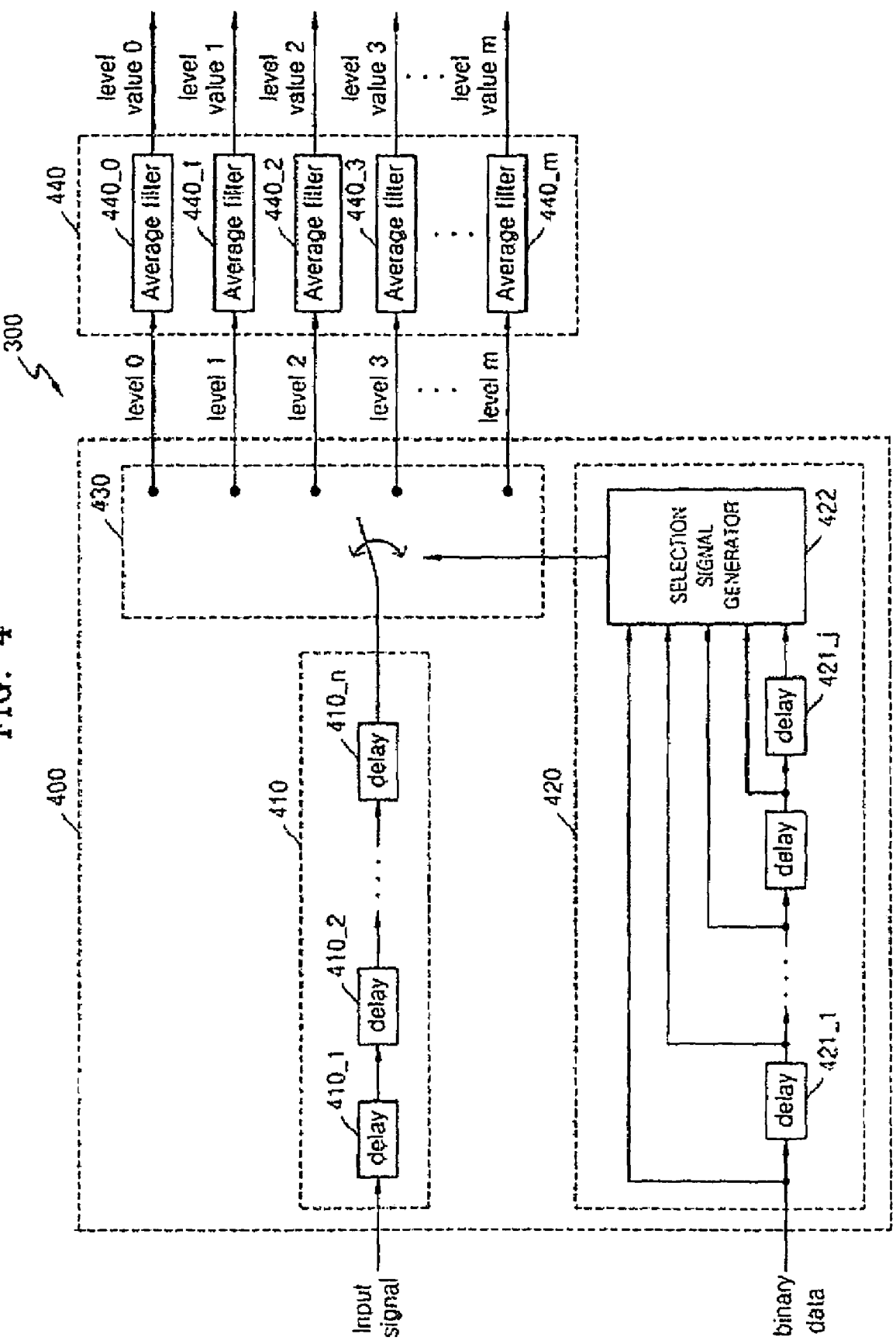
FIG. 4 is a detailed block diagram of a level value detection unit shown in FIG. 3.

More specifically, the level value detection unit 300 detects the level values of the input signal by dividing the input signal into a plurality of levels on the basis of the binary signal and obtaining an average for each of the levels. To achieve this, the level value detection unit 300 may be constructed as illustrated in FIG. 4. FIG. 4 is a detailed block diagram of the level value detection unit 300 shown in FIG. 3. Referring to FIG. 4, the level value detection unit 300 includes an input signal separator 400 and a level value detector 440.

The input signal separator 400 separates the input signal into a plurality of levels using the binary signal. To achieve this, the input signal separator 400 includes an input signal processor 410, a binary signal processor 420, and a selection unit 430.

The input signal processor 410 includes n delays 410_1, . . . , and 410_n to synchronize the input signal with the binary signal.

The binary signal processor 420 outputs a selection signal formed by combining received binary signals. To achieve this, the binary signal processor 420 includes j delays 421_1, . . . , and 421_j and a selection signal generator 422. In other words, in FIG. 4, since the binary signal processor 420 includes the j delays 421_1, and 421_j, the selection signal generator 422 can generate $2^{j+1}$ selection signals. For example, when the binary signal processor 420 includes two delays, the selection signal generator 422 can generate $2^3$ selection signals. The $2^3$ selection signals are 000, 001, 010, 011, 100, 101, 110, and 111.

The selection unit 430 selectively transmits a signal output by the input signal processor 410 according to a selection signal output by the binary signal processor 420. For example, when the binary signal processor 420 outputs a selection signal "000", the selection unit 430 outputs a level 0 for the signal output by the input signal processor 410. When the binary signal processor 420 outputs a selection signal "111", the selection unit 430 outputs a level m for the signal output by the input signal processor 410. In this case, the level m is a level 7.

As described above, the input signal separator 400 outputs a level (i.e., one of level 0 through level m) of the input signal corresponding to the binary signal. The level output by the input signal separator 400 may be considered as a presumed level of an ideal signal and is transmitted to the level value detector 440.

The level value detector 440 calculates an average of each of the levels 0 through m and detects the averages as the level values of the input signal. To achieve this, the level value detector 440 includes m+1 average filters 440_0 through 440_m. Hence, the level value detector 440 may be defined as a filter unit. The average filters 440_1 through 440_m may obtain averages of the received levels for a long interval. For example, the average filters 440_1 through 440_m may calculate level averages using Equation 1:

$$\text{updated level value} = \text{previous level value} + \frac{(\text{delayed input signal} - \text{previous level value})}{\text{constant}}$$

where the updated level value denotes an average calculated by each of the average filters 440_1 through 440_m, and the previous level value denotes an average previously calculated by each of the average filters 440_1 through 440_m. The previous level values may be stored in the respective average filters 440_1 through 440_m. The delayed input signal denotes a level output by the input signal separator 400.

In Equation 1, the constant may be empirically determined in consideration of the processing speed of a signal quality estimating apparatus. In other words, as the constant increases, the updated level value decreases and the overall processing speed of the signal quality estimating apparatus decreases. The constant may be set to, for example, 256. When an average is calculated as shown in Equation 1 and the delayed input signal is equal to the previous level value, the updated level value is equal to the previous level value.

The average filters 440_1 through 440_m may, although not necessarily, be constructed to obtain averages by using low-pass filters.

The input signal composing unit 310 composes a plurality of ideal input signals by using the level values detected by the level value detection unit 300 and pre-defined binary signals. The quality calculation unit 320 calculates the quality of the input signal on the basis of a calculation among the plurality of ideal input signals.

Figure 5:
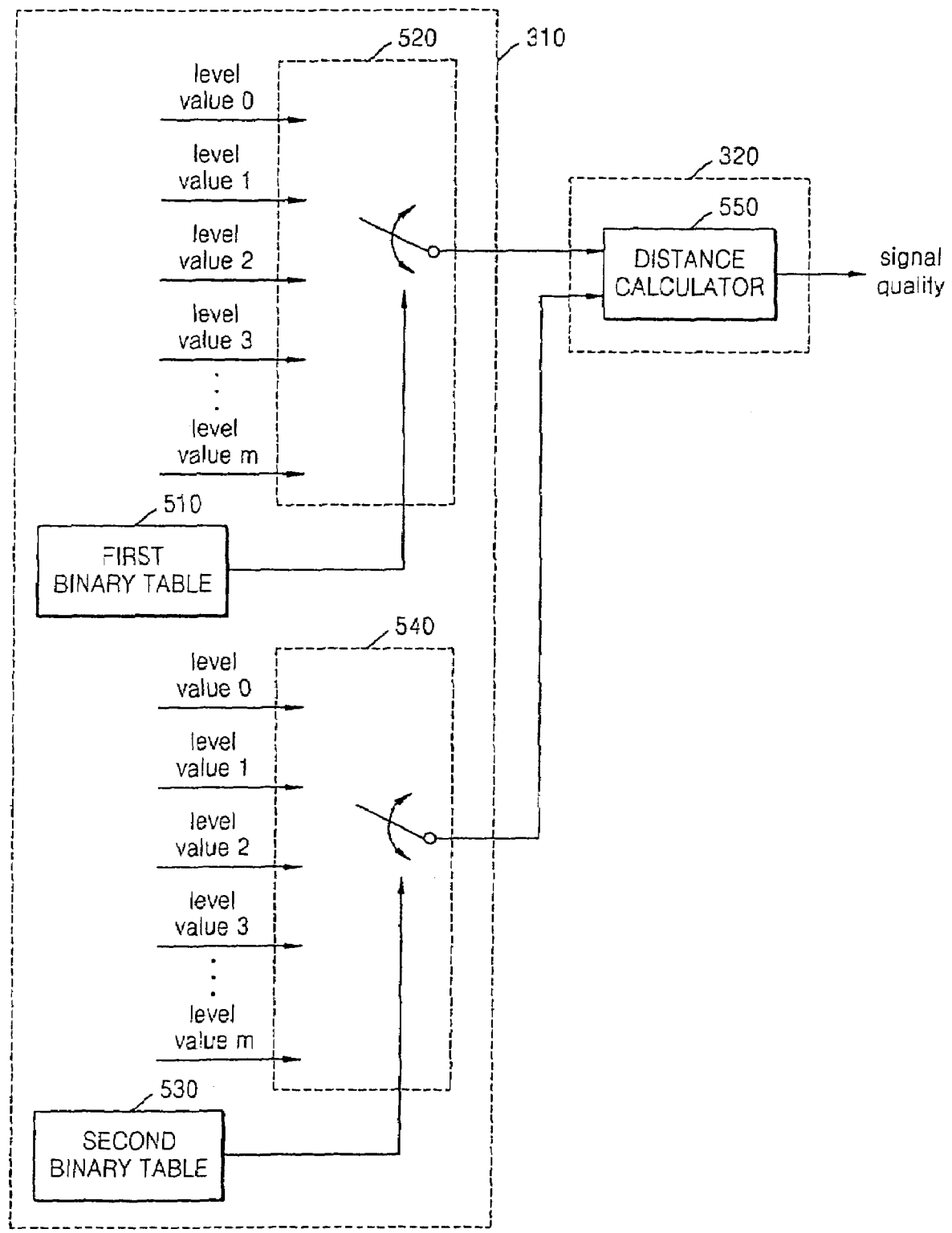
FIG. 5 is a detailed block diagram of an input signal composing unit and a quality calculation unit shown in FIG. 3.

To achieve these operations, the input signal composing unit 310 and the quality calculation unit 320 may be constructed as shown in FIG. 5. FIG. 5 is a detailed block diagram of the input signal composing unit 310 of FIG. 3 and the quality calculation unit 320 of FIG. 3. Referring to FIG. 5, the input signal composing unit 310 includes a first binary table 510 and a second binary table 530 and first selector 520 and second selector 540, and the quality calculation unit 320 includes a distance calculator 550.

The first and second binary tables 510 and 530 have pre-defined binary signals. The first selector 520 selects one of the level values received from the level value detection unit 300, based on the binary signal provided by the first binary table 510, and transmits the selected level value as an ideal input signal to the quality calculation unit 320. The second selector 540 selects one of the level values received from the level value detection unit 300, based on the binary signal provided by the second binary table 530, and transmits the selected level value as another ideal input signal to the quality calculation unit 320. Hence, as described above, the input signal composing unit 310 composes the plurality of ideal input signals.

The binary signal provided by the first binary table 510 is different from that provided by the second binary table 530 to ensure that a plurality of different input signals are composed in order to measure an error generated in the input signal. In other words, the binary signal provided by the second binary table 530 may be a signal shifted one bit from the binary signal provided by the first binary table 510. For example, when the binary signal provided by the first binary table 510 is "0000111", the binary signal provided by the second binary table 530 may be "0001111". Alternatively, the binary signal provided by the second binary table 530 may be a signal 2 T-shifted from the binary signal provided by the first binary table 510. For example, when the binary signal provided by the first binary table 510 is "00011000", the binary signal provided by the second binary table 530 may be "00001100". Alternatively, the binary signal provided by the second binary table 530 may be a signal successively shifted 2 T from the binary signal provided by the first binary table 510. For example, when the binary signal provided by the first binary table 510 is "00011001100", the binary signal provided by the second binary table 530 may be "00001100110".

When the binary signal provided by the first binary table 510 is "0000111" and the binary signal provided by the second binary table 530 is "0001111", the first selector 520 may select and transmit a level value 2, and the second selector 540 may select and transmit a level value 3.

As illustrated in FIG. 5, the quality calculation unit 320 includes the distance calculator 550. The distance calculator 550 may sum the squares of differences between level values received from the selectors 520 and 540 of the input signal composing unit 310, and output the sum as the quality of the input signal. Alternatively, the distance calculator 550 may obtain the square root of the sum of the squares of the differences between the level values received from the selectors 520 and 540, and output the square root as the quality of the input signal. Alternatively, the distance calculator 550 may divide, by the amplitude of the input signal, the square root of the sum of the squares of the differences between the level values received from the selectors 520 and 540, and output the result of the division as the quality of the input signal.

Figure 6:
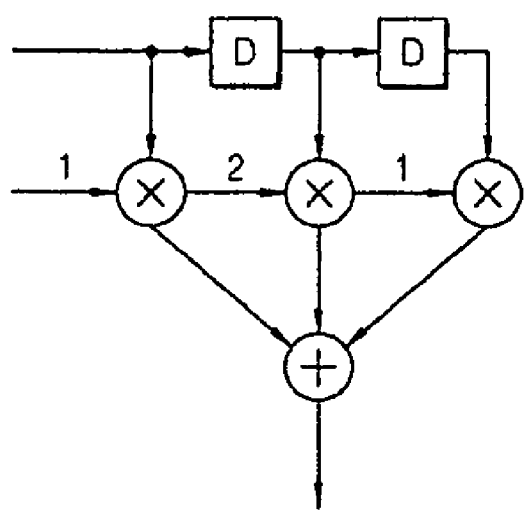
FIG. 6 illustrates a hardware structure of a PR(1, 2, 1) channel.

A principle in which the quality of an input signal is obtained from an ideal input signal will now be described. First, a principle in which the input signal is generated will be described. Looking at a partial response (PR) channel, a PR(1,2,1) channel indicates that when a binary signal is input, a signal passed through a digital filter with a filtering coefficient of 1,2,1 is obtained. The hardware structure of the PR(1,2,1) channel is illustrated in FIG. 6. Assuming, for convenience, that binary signals of −1 or 1 are input to have a DC value of 0, $2^3$ output signals are generated because three binary signals produce $2^3$ output signals. These output signals are shown in Table 1.

TABLE 1

| No. | Input | Output |
|---|---|---|
| 1 | −1 −1 −1 | −4 |
| 2 | −1 −1 +1 | −2 |
| 3 | −1 +1 −1 | 0 |
| 4 | −1 *1 +1 | +2 |
| 5 | +1 −1 −1 | −2 |
| 6 | +1 −1 +1 | 0 |
| 7 | +1 +1 −1 | +2 |
| 8 | +1 +1 +1 | +4 |

In Table 1, Nos. 3 and 6 are the cases where 1 T is output. In Blu-ray discs (BD) or high-definition DVDs (HD-DVDs), there exists no 1 T in a binary signal, and thus an output signal of 0 cannot be generated. For example, when the binary signal of the input signal is as described below, a signal output from the digital filter of FIG. 6 is as follows:

Binary data: −1 −1 −1 −1 +1 +1 −1 −1 −1 +1 +1 +1 +1 +1 +1
Output data: −4 −4 −2 +2 +2 −2 −4 −2 +2 +4 +4 +4 +4

Figure 7:
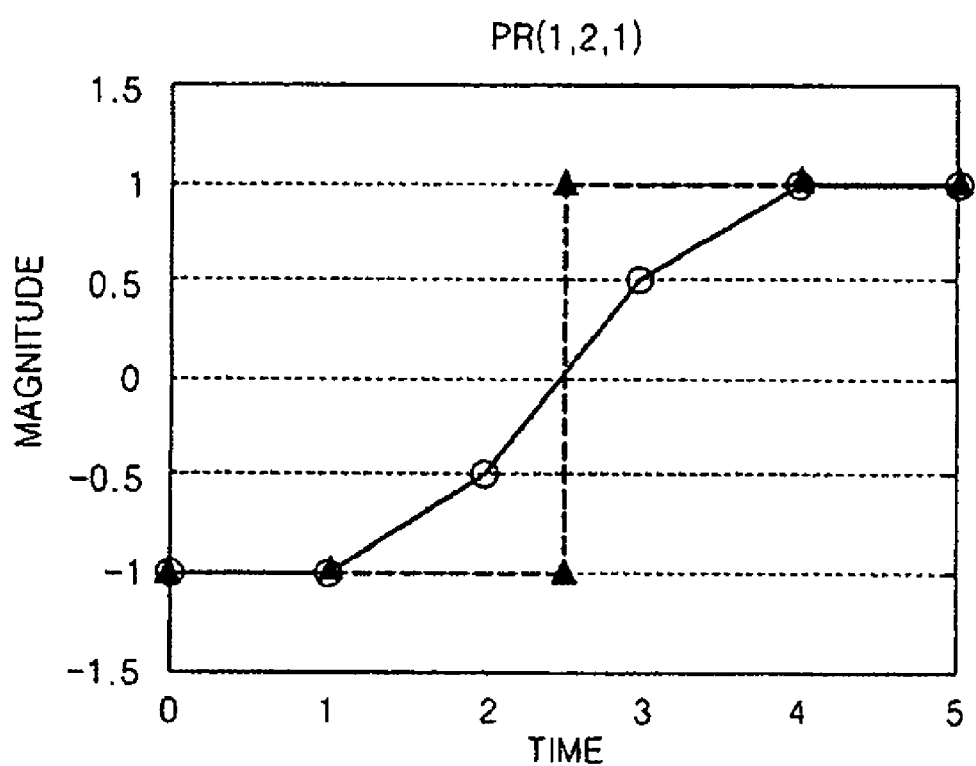
FIG. 7 is an output graph when the binary signal of an input signal varies from −1 to 1.

An output signal generated when a binary signal varies from −1 to 1 is shown in the graph of FIG. 7. In FIG. 7, the dotted line indicates the binary signal, and the solid line indicates the output signal. A response when a binary signal goes from −1 to 1 is a stepped response. That is, when the binary signal varies sharply, the output signal does not vary sharply like the variation of the binary signal but varies with a length of 3 (i.e., 3 taps) and a shape determined according to the coefficients of the 3 taps.

An inter-symbol interference (ISI) generated in the case of FIG. 7 indicates that when a stepped input signal is input, an output signal does not have the same step as the stepped input signal, but has a length of 3 and a deformed shape corresponding to the length of 3. In optical discs, the ISI is a parameter that depends on the shape of a laser spot and the length of a pit. Accordingly, when the shape of a laser spot is the same as the length of the ISI, the ISI is exactly proportional to the storage capacity of a disc. Then, in order to obtain an ideal binary signal when the ISI exists, an analysis of what distribution an ideal input signal should have is necessary.

To analyze this, the waveform of an output signal when a one bit-shifted binary signal is input to a PR(1,2,1) channel is checked. More specifically, when the input binary signal is a signal shifted one bit, the output signal of FIG. 6 is also shifted one bit. In this case, an input signal obtained by an actual circuit (i.e., the output signal of FIG. 6) is located between the signals indicated by the dotted and solid lines of FIG. 7. When widely-used partial response maximum likelihood (PRML) is used, signal estimation is made by checking whether the actual input signal is closer to the signal indicated by the dotted line or the signal indicated by the solid line.

As the distance between the signals indicated by the solid and dotted lines of FIG. 7 increases, the probability of generation of an error in a distribution in which an ideal input signal can be located decreases. The basic principle of PRML is to determine whether an input signal is closer to the solid or dotted line of FIG. 7, so that as the distance between the solid-line and dotted-line waveforms of FIG. 7 increases, it is more clearly determined which one of the solid-line and dotted-line waveforms the actual input signal is closer to.

Generally, the distance between the two signal waveforms is a Euclidian distance, which is obtained by summing the squares of differences between two signals that are input every unit of time.

Figure 8:
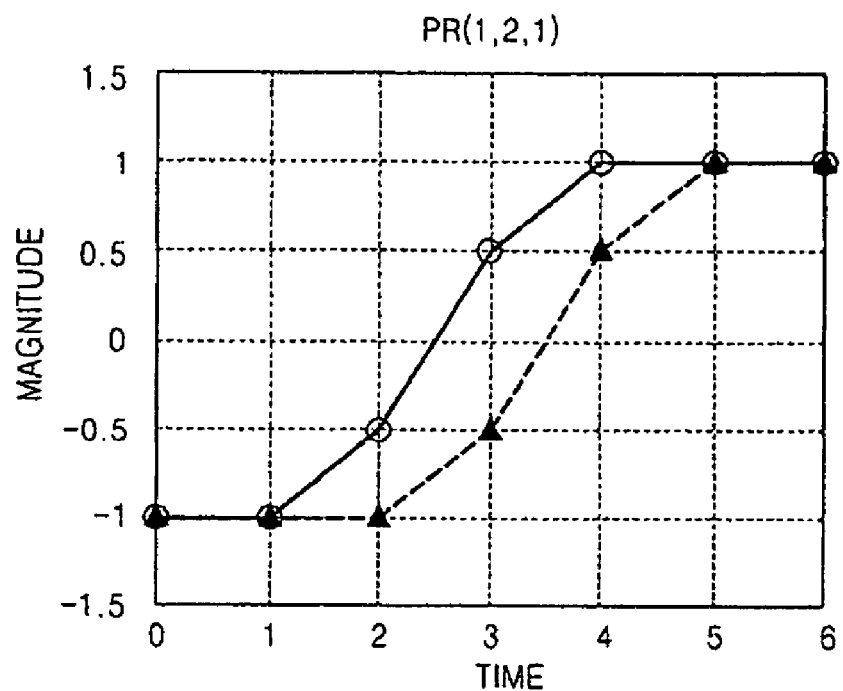
FIG. 8 is a graph showing a variation of an output waveform when one waveform is shifted one bit from the other waveform.

For example, a distance between the two waveforms of FIG. 8 is 1.5 (=$0.5^2+1^2+0.5^2$) mm. In other words, as the distance of 1.5 mm increases, signal estimation becomes easier. FIG. 8 is a graph showing a case where one waveform is shifted one bit from the other waveform. Then, when a general three tap PR model is applied, the distribution of an ideal waveform (i.e., a level distribution) can be obtained in the form of a PR (a,b,a), where a and b should meet the following conditions:
1. a<b (i.e., a condition of the spot distribution of an optical disc in which the center portion of the spot is larger than the other portions thereof)
2. a+b+a=1 (i.e., a condition of a general FIR filter)
3. a>0, b>0

These conditions can be expressed as b=1−2a and 0<a<0.5. Under these conditions, Table 1 is modified into Table 2.

TABLE 2

| No. | Input | Output |
|---|---|---|
| 1 | −1 −1 −1 | −2a − b |
| 2 | −1 −1 +1 | −b |
| 3* | −1 +1 −1 | −2a + b |
| 4 | −1 *1 +1 | b |
| 5 | +1 −1 −1 | −b |
| 6 | +1 −1 +1 | 2a − b |
| 7 | +1 +1 −1 | b |
| 8 | +1 +1 +1 | 2a + b |

The distance between the two waveforms of FIG. 8 can be obtained using the formula, $(-2a)^2+(2b)^2+(2a)^2$. By erasing b from the formula, $(-2a)^2+(2b)^2+(2a)^2$, the formula $(-2a)^2+(2b)^2+(2a)^2$ can be simplified into the formula $24a^2-16a+4$.

Figure 9:
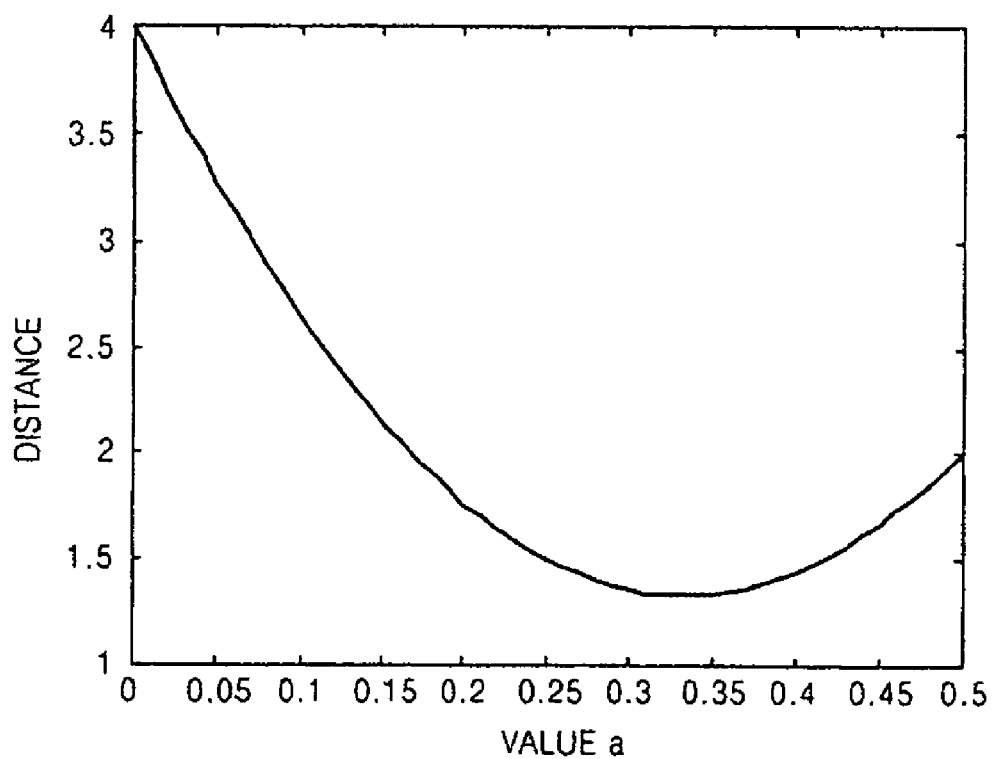
FIG. 9 is a graph showing a distance between two waveforms versus a value "a"

Referring to FIG. 9, where 0<a<0.5, when a is 0, the maximum of the formula is $24a^2-16a+4$ is 4, and when a is ⅓, the minimum of the formula is 4/3. FIG. 9 is a graph showing a distance between two waveforms versus a value of a". In FIG. 9, the horizontal axis indicates the value of a, and the vertical axis indicates the distance.

Hence, the best detection over the input signal is made when a three tap PR channel is a PR(0,1,0) channel. The worst detection over the input signal is made when the three tap PR channel is a PR(1/3,1/3,1/3) channel. Looking at this relationship in view of a level distribution, when the three tap PR channel is the PR(0,1,0) channel, the level distribution of the input signal is completely the same as an ideal square wave. As the three tap PR channel is closer to the PR(0,1,0) channel, a detection rate for an input signal increases.

When PR(1,2,1) is compared with PR(1,8,1), PR(1,2,1) produces an Euclidian distance of 1.5 mm, and PR(1,8,1) produces an Euclidian distance of 1.76 mm. Hence, PR(1,8,1) provides a better detection rate for an input signal than PR(1,2,1). As a modulation amplitude of 2 T increases, the performance of PRML becomes better.

Accordingly, the circuits of FIGS. 4 and 5 detect level values of an input signal from the input signal and a binary signal, compose two ideal input signals according to the detected level values and pre-defined binary signals, and obtain a distance between the two ideal input signals. The quality of an input signal is estimated based on the distance.

Figure 10A:
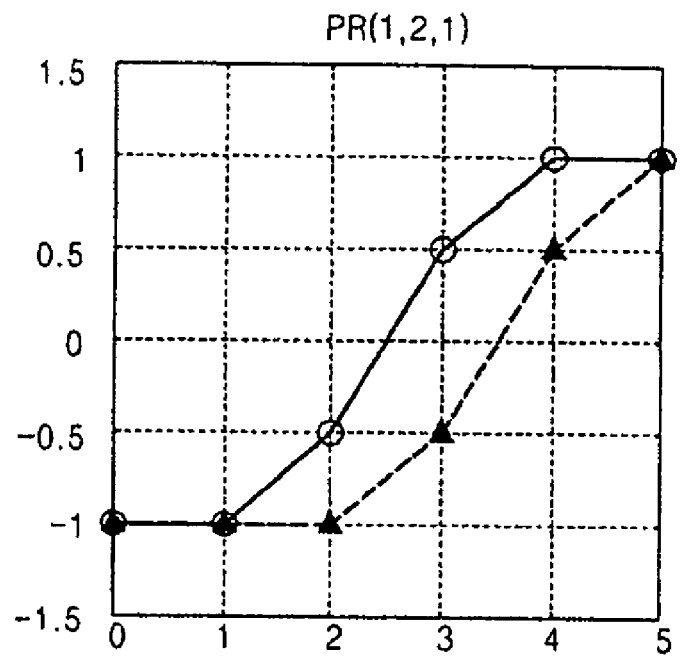
FIG. 10A is a graph showing a distance between two waveforms when a three tap PR channel is PR(1, 2, 1)
Figure 10B:
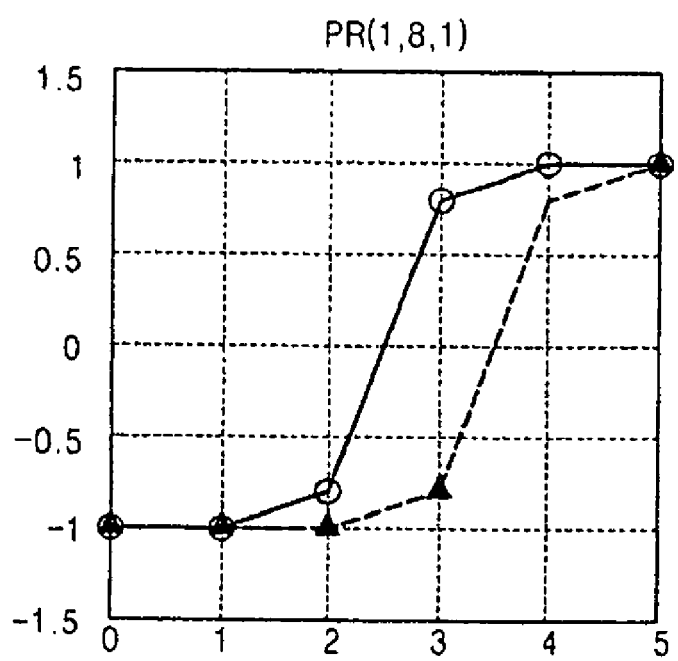
FIG. 10B is a graph showing a distance between two waveforms when a three tap PR channel is PR(1, 8, 1)
Figure 11A:
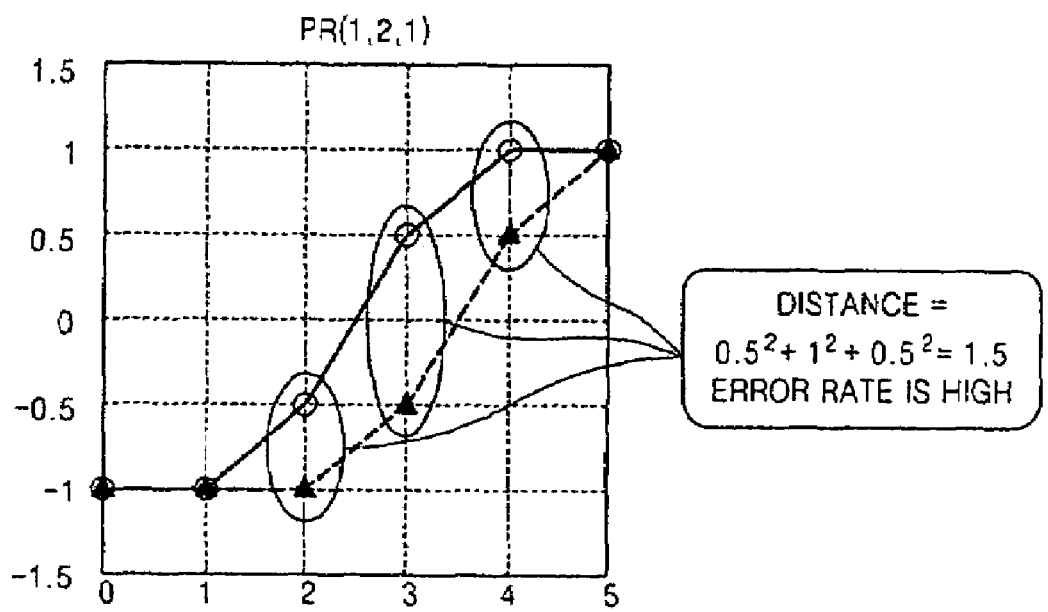
FIG. 11A is a graph showing FIG. 10A in a physical sense.
Figure 11B:
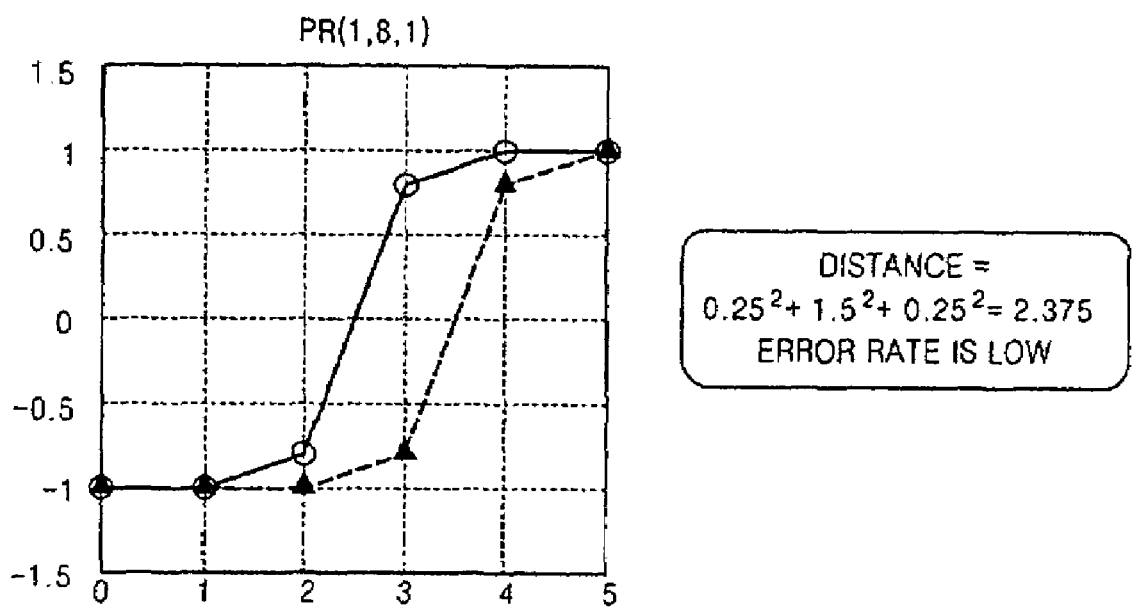
FIG. 11B is a graph showing FIG. 10B in a physical sense.

That is, a distance may be defined as an example of a signal quality. A distance between two different signals as shown in FIGS. 10A and 10B (where FIG. 10A shows a signal difference in a PR(1,2,1) channel, and FIG. 10B shows a signal difference in a PR(1,8,1) channel) can be obtained using Equation 2:

$$\sum_{j=0}^{M-1}\left[\left(\sum_{i=0}^{N-1}(RF_{true(j)}(i)-RF_{false(j)}(i))^2\right)\bigg/NRZI_{difference}(j)\right]$$

where $RF_{true}$ denotes waveforms indicated by the solid lines of FIGS. 10A and 10B, and $RF_{false}$ denotes waveforms indicated by the dotted lines of FIGS. 10A and 10B. Equation 2 is represented in a physical sense as shown in FIGS. 11A and 11B. FIG. 11A shows a physical sense of Equation 2 when a three tap PR channel is PR(1,2,1). FIG. 11B shows a physical sense of Equation 2 when a three tap PR channel is PR(1,8,1). In Equation 2, $NRZI_{difference}$ denotes a value of bits making up a difference between two binary signal strings that constitute an input signal.

Another method of estimating the quality of a signal, in which a signal noise rate (SNR) is calculated using the level value detection unit 300, an input signal, and a binary signal, is defined as Equation 3:

$$LSNR = 10 \log_{10}(\Sigma \text{ideal signal}^2)/(\Sigma \text{noise signal}^2)$$

Figure 12:
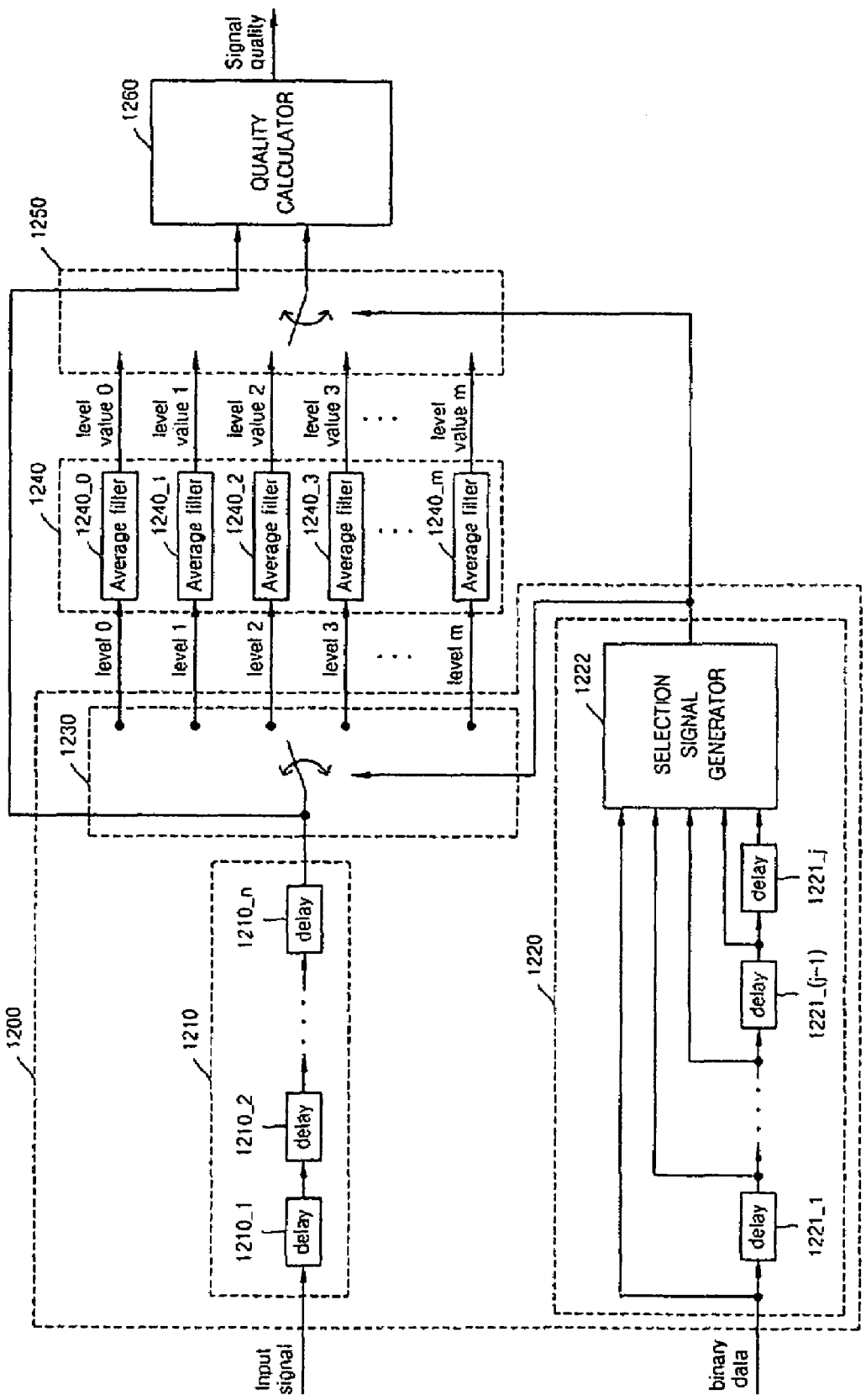
FIG. 12 is a detailed block diagram of an input signal quality estimating apparatus based on a level signal noise rate (LSNR) calculation, according to another embodiment of the present invention.

A signal obtained using Equation 3 is a signal obtained from a level, and thus the signal is represented as level SNR (LSNR) for convenience. An input signal quality estimating apparatus based on the LSNR calculation according to another embodiment of the present invention is constructed as shown in FIG. 12. FIG. 12 is a detailed block diagram of an apparatus to estimate the quality of an input signal based on the LSNR calculation. Referring to FIG. 12, the apparatus includes an input signal separation unit 1200, a level value detection unit 1240, a selector 1250, and a quality calculator 1260.

The input signal separation unit 1200 is structurally the same as the input signal separator 400 shown in FIG. 4. Accordingly, the input signal separation unit 1200 includes an input signal processor 1210, a binary signal processor 1220, and a selection unit 1230. The input signal processor 1210 includes n delays 1210_1 through 1210_n, and the binary signal processor 1220 includes j delays 1221_1 through 1221_j and a selection signal generator 1222. The selection unit 1230 selectively transmits a signal output by the input signal processor 1210, according to a signal output by the binary signal processor 1220.

The level value detection unit 1240 is structurally and operationally the same as the level value detector 440 shown in FIG. 4. The selector 1250 selects one of the level values output by the level value detection unit 1240, according to the signal output by the binary signal processor 1220.

The quality calculator 1260 calculates and outputs the quality of the input signal on the basis of the LSNR calculation.

When the signal quality estimating apparatus of FIG. 3 is combined with the signal quality estimating apparatus of FIG. 12, an accurate signal quality can be measured. That is, when the distance obtained by the quality calculation unit 320 of FIG. 3 and the result of the calculation made by the quality calculator 1260 of FIG. 12 are subject to an arithmetic operation, such as Equation 4, an accurate signal quality can be measured. Equation 4 is as follows:

$$\text{New parameter} = sqrt(\text{distance}) * LSNR$$

Based on Equation 4, the quality calculation unit 320 of FIG. 3 may be combined with the quality calculator 1260 of FIG. 12. The new parameter of Equation 4 can be defined as an estimated signal quality.

Figure 13A:
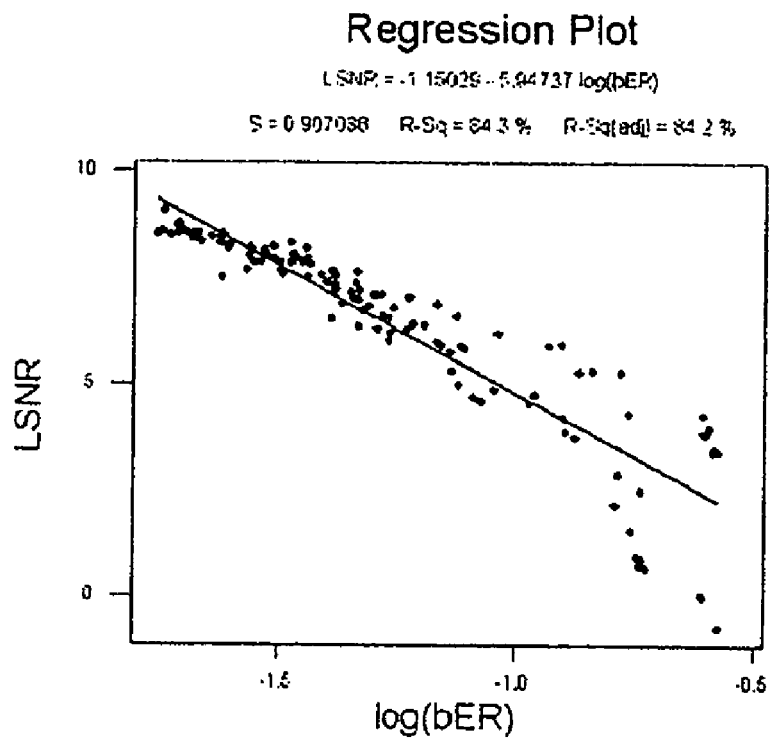
FIGS. 13A through 13C are correlation diagrams with respect to a signal quality.
Figure 13B:
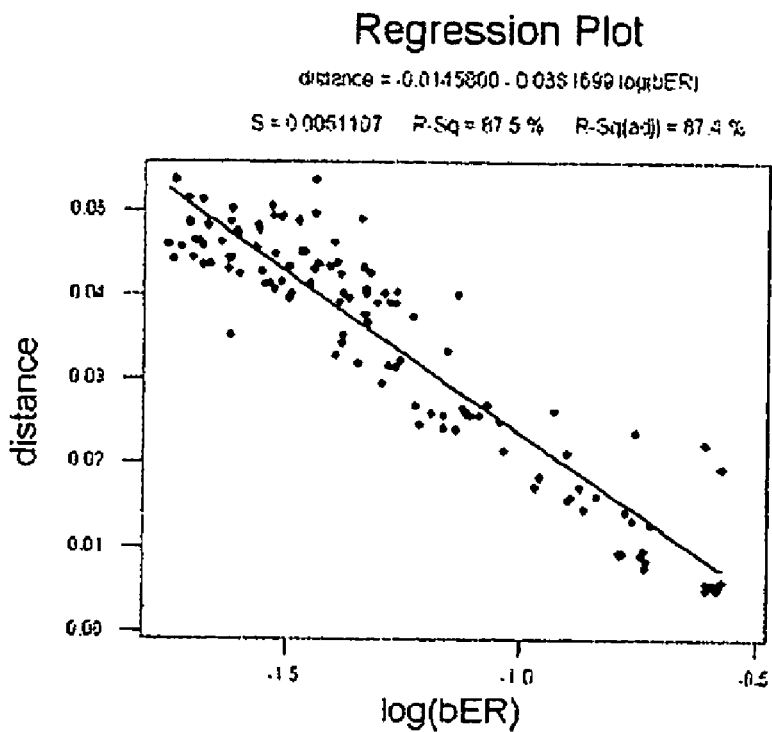
Figure 13C:
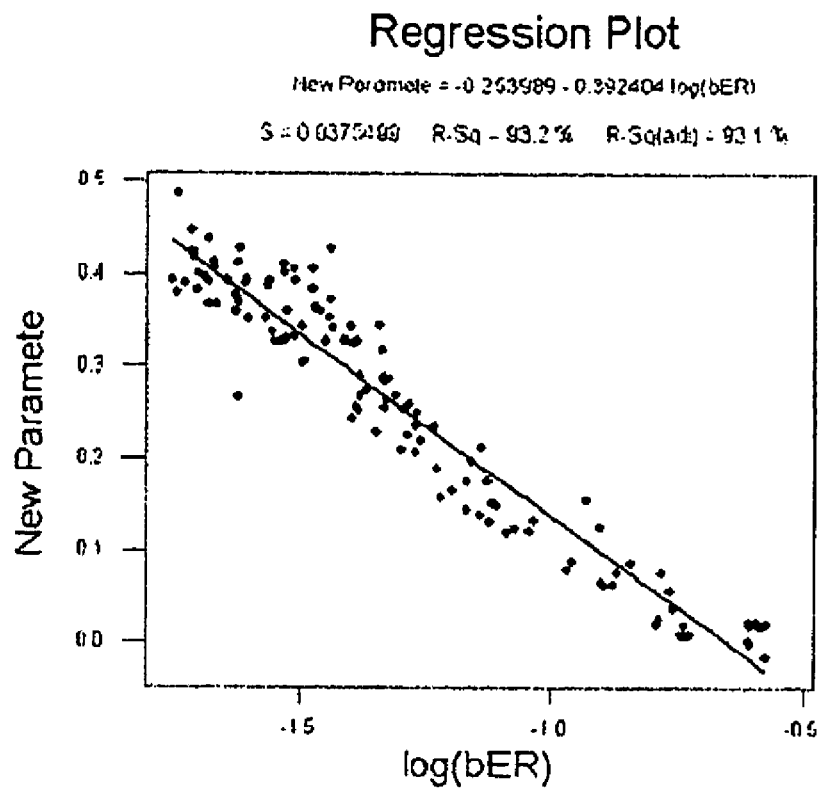

Generally, the LSNR is an index that represents how much noise is included in an input signal. The larger the LSNR, the better the quality of the input signal. The distance represents output characteristics depending on the frequency of an input signal from which noise has been removed. Also, the larger the distance, the better the quality of the input signal. Hence, when the two parameters (the LSNR and the distance) are combined with each other, the quality of the input signal can be accurately measured. FIG. 13A is a correlation diagram between the quality of a signal measured using the LSNR calculation and a bit error rate. FIG. 13B is a correlation diagram between the quality of a signal measured using the distance and a bit error rate. FIG. 13C is a correlation diagram between the quality of a signal measured based on a combination of the LSNR calculation and the distance calculation and a bit error rate. A more accurate signal quality can be measured when the LSNR calculation and the distance calculation are combined with each other as shown in FIG. 13C than when only using the LSNR calculation (FIG. 13A) and when only using the distance calculation (FIG. 13B).

Hence, according to an aspect of the present invention, the quality calculation unit 320 of FIG. 3 may be provided to obtain the quality of the input signal according to a distance and an LSNR that are obtained based on two ideal signals. The distance defined as Equation 2 is a sum of the squares of differences between two signals. Accordingly, to obtain a geometric distance average, a square root (sqrt) function is applied to the sum of the squares of the differences between two signals, such that Equation 4 is obtained by applying a sqrt function to the distance of Equation 2.

In some cases, an operation of normalizing the signal quality obtained by Equation 4 to a maximum amplitude of an input signal may be used to compensate for the magnitude of the input signal. In these cases, Equation 4 may be re-defined as Equation 5:

$$\text{New parameter} = \frac{sqrt(\text{distance}) \times LSNR}{\text{Amplitude of input signal}}$$

The new parameter of Equation 5 is as an estimated signal quality.

In addition, the signal quality estimation defined in Equation 4 can be re-defined as Equation 6:

$$\text{New parameter} = \frac{10\log_{10}(\sum \text{distance})}{\sum \text{noise signal}^2}$$

The signal quality is obtained by Equation 6 based on the distance between two signals. That is, as in Equation 6, the sum of the square of the noise signal is calculated with the sum of distance between two signals to obtain the signal quality. The log of Equation 6 is a concept used to indicate dB. Accordingly, if the log does not need to indicate dB, $10 \log_{10}$ of Equation 6 can be deleted. The new parameter of Equation 6 is an estimated signal quality.

By using the signal quality estimating apparatuses according to aspects of the present invention, even the quality of a signal read out from high-density discs can be accurately estimated. Hence, the estimated quality value may be utilized in, for example, focus correction, tilt correction, detracking correction, optimization of a recording signal, etc.

Figure 14:
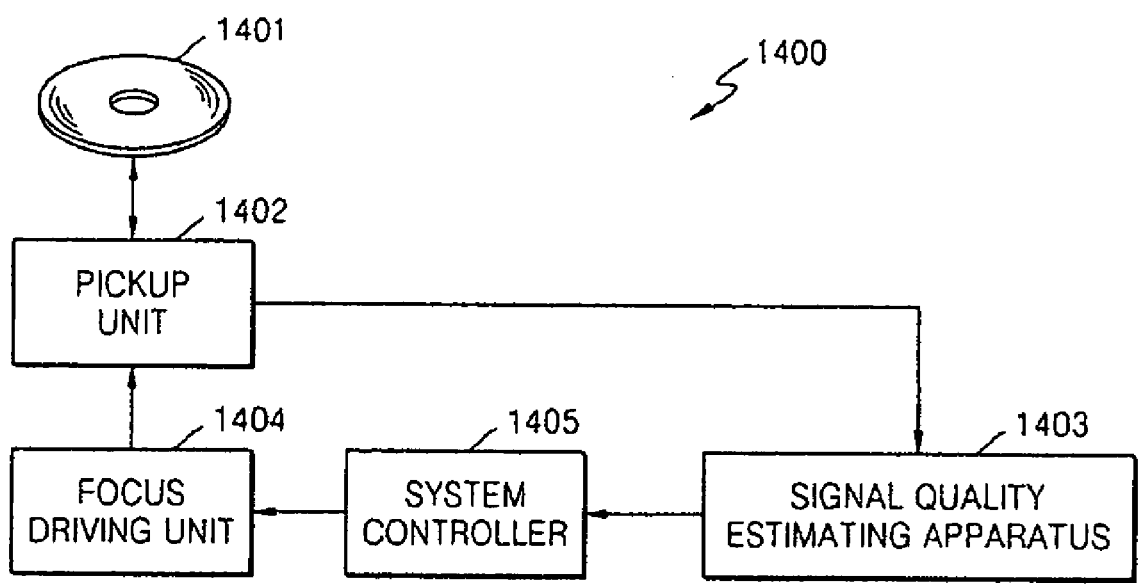
FIG. 14 is a functional block diagram of an optical disc driver according to an embodiment of the present invention.

For example, in focus correction by an optical disc driver, the qualities of signals reproduced from a disc are measured while a focusing location to be focus-corrected varies, and a focusing location from which the signal of the best quality has been reproduced is searched. To achieve this, an optical disc driver 1400 according to an embodiment of the present invention may be constructed as illustrated in FIG. 14. Referring to FIG. 14, the optical disc driver 1400 includes: a signal quality estimating apparatus 1403 according to aspects of the present invention that estimates the quality of a reproduced signal picked up from a disc 1401 by a pickup unit 1402 by using a relationship among the reproduced signal, a binary signal of the reproduced signal, and a plurality of ideal reproduced signals; and a system control unit 1405 that finely adjusts a focus offset of a focus driving unit 1404 according to the result of the estimation made by the signal quality estimating apparatus 1403. As a result, the focusing driving unit 1404 drives focusing at the focusing location from which the signal of the best quality has been reproduced. The focusing location from which the signal of the best quality has been reproduced may be a location where the new parameter of Equation 4 or 5 is maximum. It is understood that, according to aspects of the present invention, the optical disc driver 1400 may be re-constructed such that the signal quality estimating apparatus 1403 is included in the system control unit 1405.

Figure 15:
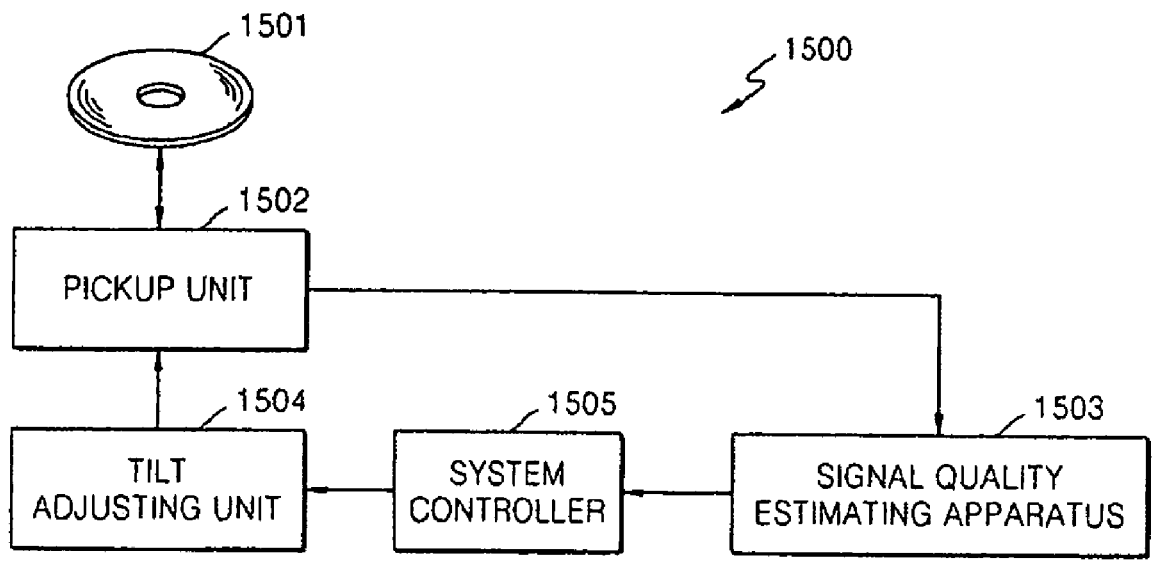
FIG. 15 is a functional block diagram of an optical disc driver according to another embodiment of the present invention.

In tilt correction by an optical disc driver, the qualities of signals reproduced from a disc are measured while a tilting location to be tilt-corrected varies, and a tilting location from which the signal of the best quality has been reproduced is searched. To achieve this, an optical disc driver 1500 according to an embodiment of the present invention may be constructed as illustrated in FIG. 15. Referring to FIG. 15, the optical disc driver 1500 includes: a signal quality estimating apparatus 1503 according to aspects of the present invention that estimates the quality of a reproduced signal picked up from a disc 1501 by a pickup unit 1502 by using a relationship among the reproduced signal, a binary signal of the reproduced signal, and a plurality of ideal reproduced signals; and a system control unit 1505 that controls a tilt adjusting unit 1504 to finely adjust a tilt according to the result of the estimation made by the signal quality estimating apparatus 1503 and to search the tilting location from which the signal of the best quality has been reproduced. The tilting location from which the signal of the best quality has been reproduced may be a location where the new parameter of Equation 4 or 5 is maximum. It is understood that, according to aspects of the present invention, the optical disc driver 1500 may be re-constructed such that the signal quality estimating apparatus 1503 is included in the system control unit 1505.

Figure 16:
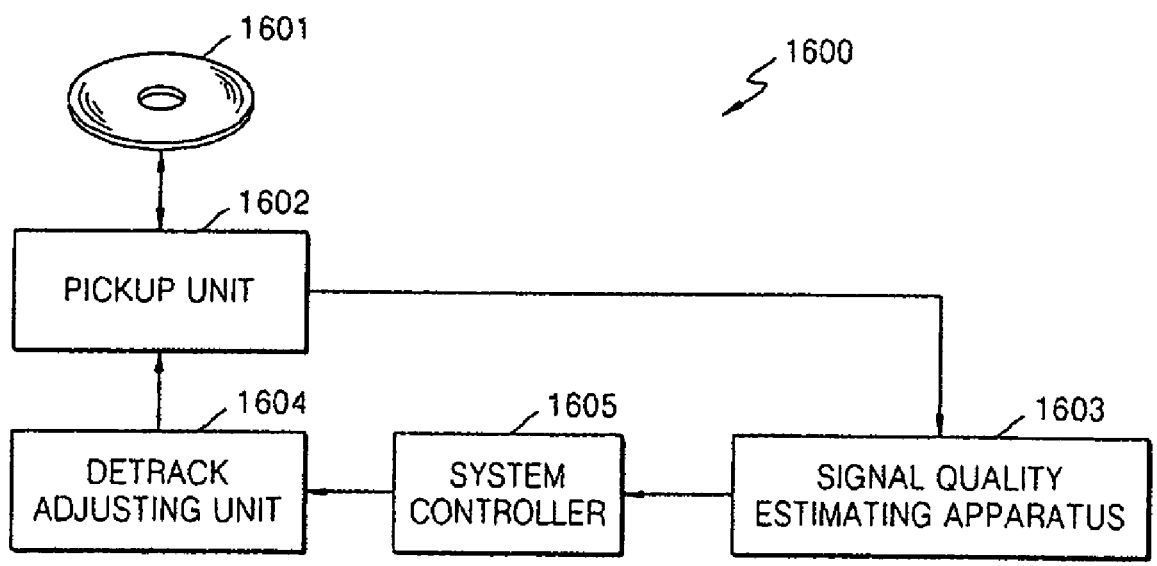
FIG. 16 is a functional block diagram of an optical disc driver according to another embodiment of the present invention.

In detracking correction by an optical disc driver, the qualities of signals reproduced are measured while a detracking location to be detracking-corrected varies, and a detracking location from which the signal of the best quality has been reproduced is searched. To achieve this, an optical disc driver 1600 according to an embodiment of the present invention may be constructed as illustrated in FIG. 16. Referring to FIG. 16, the optical disc driver 1600 includes: a signal quality estimating apparatus 1603 according to aspects of the present invention that estimates the quality of a reproduced signal picked up from a disc 1601 by a pickup unit 1602 by using a relationship among the reproduced signal, a binary signal of the reproduced signal, and a plurality of ideal reproduced signals; and a system control unit 1605 that controls a detrack adjusting unit 1604 to finely adjust a detrack offset according to the result of the estimation made by the signal quality estimating apparatus 1603 and to search a detracking. location from which the signal of the best quality has been reproduced. The detracking location from which the signal of the best quality has been reproduced may be a location where the new parameter of Equation 4 or 5 is maximum. It is understood that, according to aspects of the present invention, the optical disc driver 1600 may be re-constructed such that the signal quality estimating apparatus 1603 is included in the system control unit 1605.

Figure 17:
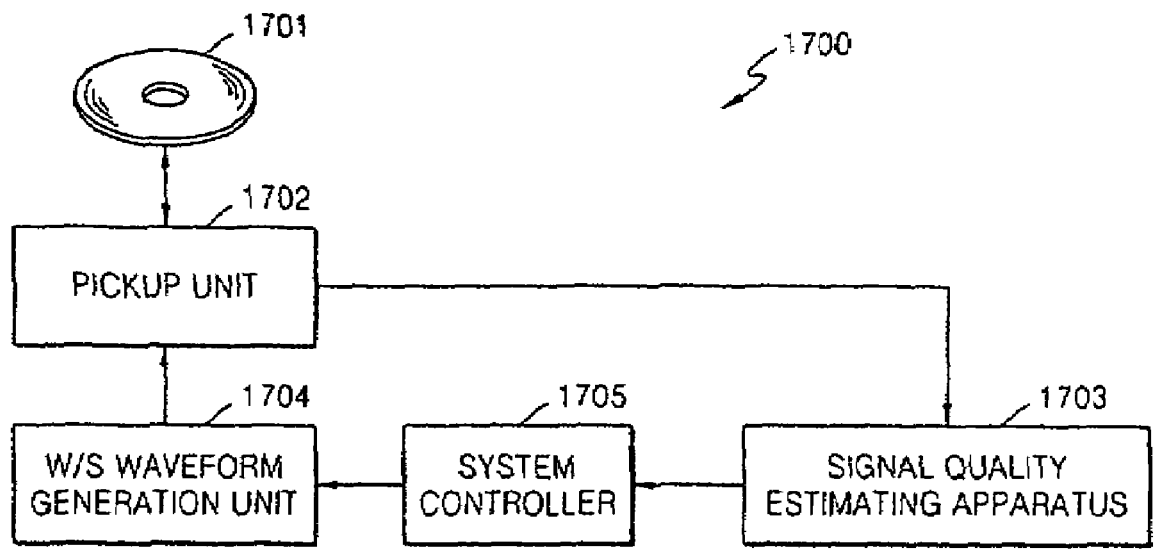
FIG. 17 is a functional block diagram of an optical disc driver according to another embodiment of the present invention.

To optimize a writing signal, an optical disc driver writes data on an optical disc in various writing conditions, reads signals from the data-recorded disc, measures the qualities of the read signals, and adjusts a writing condition to a writing condition corresponding to the read signal of the best quality. To achieve this, an optical disc driver 1700 according to an embodiment of the present invention may be constructed as illustrated in FIG. 17. Referring to FIG. 17, the optical disc driver 1700 includes: a signal quality estimating apparatus 1703 according to aspects of the present invention that estimates the quality of a reproduced signal picked up from a disc 1701 by a pickup unit 1702 by using a relationship among the reproduced signal, a binary signal of the reproduced signal, and a plurality of ideal reproduced signals; and a system control unit 1705 that controls a writing strategy (w/s) waveform generation unit 1704 to generate a writing waveform according to the result of the estimation made by the signal quality estimating apparatus 1703 so that a writing condition is adjusted to a writing condition corresponding to the signal of the best quality among signals reproduced from the disc 1701 to which data has been recorded under various writing conditions. The writing condition from which the signal of the best quality has been reproduced may be a writing condition where the new parameter of Equation 4 or 5 is maximum. It is understood that, according to aspects of the present invention, the optical disc driver 1700 may be re-constructed such that the signal quality estimating apparatus 1703 is included in the system control unit 1705.

Figure 18:
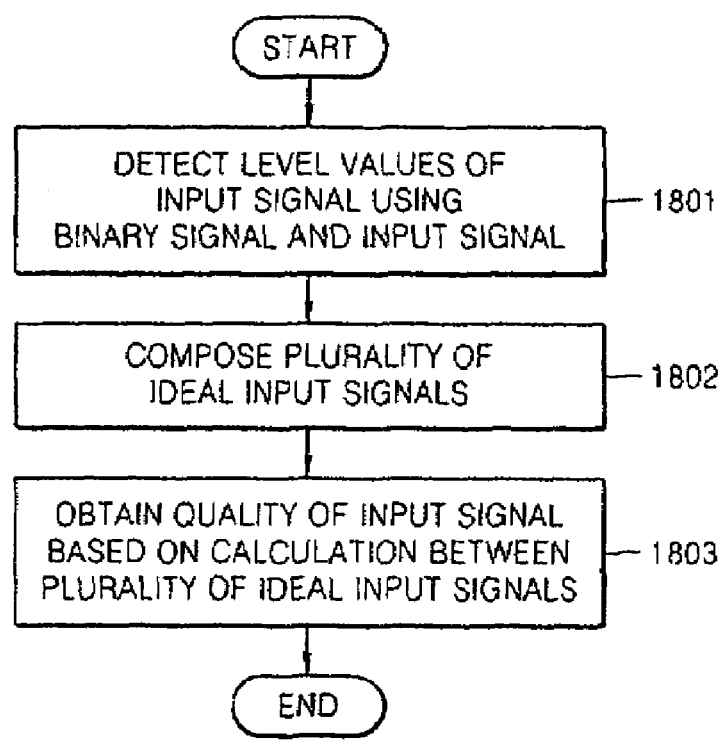
FIG. 18 is a flowchart illustrating an input signal quality estimating method according to an embodiment of the present invention.

FIG. 18 is a flowchart illustrating an input signal quality estimating method according to an embodiment of the present invention. Referring to FIG. 18, in operation 1801, level values of an input signal are detected using the input signal and a binary signal, such as the operation of the level value detection unit 300 of FIG. 3. That is, in operation 1801, the input signal is divided into a plurality of levels using the binary signal, an average of each of the levels of the input signal is calculated, and the averages are detected as the level values of the input signal.

Then, in operation 1802, a plurality of ideal input signals are composed according to the level values of the input signal and a plurality of pre-defined binary signals, such as the operation of the input signal composing unit 310 of FIG. 3. That is, in operation 1802, the level values of the input signal detected in operation 1801 are selected according to the pre-defined binary signals to thereby compose the plurality of ideal input signals.

In operation 1803, a calculation between the plurality of ideal input signals is made to obtain a quality of the input signal. According to an aspect of the present invention the calculation between the plurality of ideal input signals is similar to that made in the quality calculation unit 320 of FIG. 3. Alternatively, according to other aspects of the present invention, the calculation between the plurality of ideal input signals may be similar to a combination of the calculations of the quality calculation unit 320 of FIG. 3 and the quality calculator 1260 of FIG. 12. In addition, according to other aspects of the present invention, in operation 1803, the quality of the input signal can be obtained by Equation 6.

In other words, in operation 1803, a square root of a sum of the squares of differences between the plurality of ideal input signals may be obtained as the quality of the input signal. Alternatively, in operation 1803, the square root of the sum of the squares of the differences between the plurality of ideal input signals may be divided by the amplitude of the input signal, and the result of the division is the quality of the input signal. Alternatively, in operation 1803, a level signal to noise ratio (LSNR) may be further calculated using the input signal and the binary signal, and the quality of the input signal LSNR may be obtained by performing an arithmetic operation on the calculated LSNR and the result of the calculation between the plurality of ideal input signals.

Alternatively, in operation 1803, the LSNR may be further calculated using the input signal and the binary signal, and the quality of the input signal LSNR may be obtained by performing an arithmetic operation on a result of normalization of the calculated LSNR to the amplitude of the input signal and the result of the calculation between the plurality of ideal input signals.

A program for executing a signal quality estimating apparatus according to aspects of the present invention can be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and a computer data signal embodied in a carrier wave including a compression source code segment and an encryption source code segment (such as data transmission through the Internet). The computer-readable recording medium can also be distributed over network coupled computer systems so that the computer-readable code is stored and executed in a distributed fashion.

As described above, aspects of the present invention provide a signal quality estimating apparatus and a signal quality estimating method by which the quality of an input signal (or a reproduced signal or an RF signal) can be accurately estimated regardless of the recording density of an optical disc.

Aspects of the present invention also provide an optical disc driver capable of accurately following a focus offset, an optical disc driver capable of accurately following a tilt, an optical disc driver capable of accurately following detracking, and an optical disc driver capable of recognizing accurate recording conditions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A signal quality estimating apparatus comprising:
    a level value detection unit to detect level values of an input signal according to a binary signal of the input signal;
    an input signal composing unit to compose a plurality of ideal input signals by using the level values and a plurality of pre-defined binary signals; and
    a quality calculation unit to obtain a quality of the input signal according to a calculation between the plurality of ideal input signals,
    wherein the calculation provides a sum of squares of the plurality of ideal input signals or a square root of the sum of the squares as the quality of the input signals.

2. The signal quality estimating apparatus as claimed in claim 1, wherein the level value detection unit comprises:
    an input signal separator to separate the input signal into a plurality of levels using the binary signal; and
    a level value detector to obtain averages of each of the levels of the input signal such that the averages are the level values of the input signal.

3. The signal quality estimating apparatus as claimed in claim 2, wherein the input signal separator comprises one or more delays that delay the input signal before separating the input signal into the plurality of levels in order to synchronize the input signal with the binary signal.

4. The signal quality estimating apparatus as claimed in claim 2, wherein the level value detector obtains the averages using low-pass filters.

5. The signal quality estimating apparatus as claimed in claim 2, wherein the level value detector obtains the averages using an equation:

$$\text{updated level value} = \text{previous level value} + \frac{\left(\begin{array}{c}\text{delayed input signal} - \\ \text{previous level value}\end{array}\right)}{\text{constant}}$$

where the updated level value corresponds to each of the averages and the previous level value corresponds to each of previously calculated averages.

6. The signal quality estimating apparatus as claimed in claim 1, wherein the input signal composing unit comprises:
    a plurality of binary tables comprising the pre-defined binary signals.

7. The signal quality estimating apparatus as claimed in claim 6, wherein the input signal composing unit further comprises:
    a plurality of selectors to select a plurality of level values from among the level values detected by the level value detection unit according to the pre-defined binary signals of the plurality of binary tables, and to transmit the selected level values as the plurality of ideal input signals.

8. The signal quality estimating apparatus as claimed in claim 7, wherein the plurality of binary tables comprises a first binary table outputting a first binary signal, of the pre-defined binary signals, and a second binary table outputting a second binary signal, of the pre-defined binary signals, different from the first binary signal.

9. The signal quality estimating apparatus as claimed in claim 7, wherein the quality calculation unit calculates a sum of squares of differences between the plurality of level values received from the plurality of selectors, and outputs the sum as the quality of the input signal.

10. The signal quality estimating apparatus as claimed in claim 7, wherein the quality calculation unit calculates a square root of a sum of squares of differences between the plurality of level values received from the plurality of selectors, and outputs the square root as the quality of the input signal.

11. The signal quality estimating apparatus as claimed in claim 7, wherein the quality calculation unit calculates a division, by an amplitude of the input signal, of a square root of a sum of squares of differences between the plurality of level values received from the plurality of selectors, and outputs a result of the division as the quality of the input signal.

12. The signal quality estimating apparatus as claimed in claim 1, wherein the quality calculation unit calculates a level signal to noise ratio (LSNR) using the input signal and the binary signal, such that a higher a value of the LSNR corresponds to a better signal quality.

13. The signal quality estimating apparatus as claimed in claim 12, wherein the quality calculation unit calculates the LSNR by performing an equation:

$\text{LSNR} = 10\log_{10}(\Sigma \text{ideal signal}^2)/(\Sigma \text{noise signal}^2)$.

14. The signal quality estimating apparatus as claimed in claim 12, wherein the quality calculation unit obtains the quality of the input signal by performing an arithmetic operation on the calculated LSNR and the calculation between the plurality of ideal input signals.

15. The signal quality estimating apparatus as claimed in claim 14, wherein the quality calculation unit obtains the quality of the input signal by performing an equation:

New parameter=sqrt(distance)*LSNR, where the New parameter corresponds to the quality of the input signal and the distance corresponds to a distance between two ideal input signals.

16. The signal quality estimating apparatus as claimed in claim 12, wherein the quality calculation unit obtains the quality of the input signal by performing an arithmetic operation on a result of a normalization of the LSNR to an amplitude of the input signal with the calculation between the plurality of ideal input signals.

17. The signal quality estimating apparatus as claimed in claim 16, wherein the quality calculation unit obtains the quality of the input signal by performing an equation:

$$\text{New parameter} = \frac{sqrt(\text{distance}) \times LSNR}{\text{Amplitude of input signal}}$$

where the New parameter corresponds to the quality of the input signal and the distance corresponds to a distance between two ideal input signals.

18. The signal quality estimating apparatus as claimed in claim 1, wherein the quality calculation unit obtains the quality of the input signal by performing an equation:

$$\text{New parameter} = \frac{10\log_{10}(\sum \text{distance})}{\sum \text{noise signal}^2},$$

where the New parameter corresponds to the quality of the input signal and the distance corresponds to a distance between two ideal input signals.

19. A signal quality estimating method comprising:
  detecting level values of an input signal according to a binary signal of the input signal;
  composing a plurality of ideal input signals by using the level values and a plurality of pre-defined binary signals; and
  obtaining a quality of the input signal according to a calculation between the plurality of ideal input signals,
  wherein the calculation provides a sum of squares of the plurality of ideal input signals or a square root of the sum of the squares as the quality of the input signals.

20. The signal quality estimating method as claimed in claim 19, wherein the detecting of the level values comprises:
  separating the input signal into a plurality of levels using the binary signal; and
  obtaining averages of each of the levels of the input signal such that the averages are the level values of the input signal.

21. The signal quality estimating method as claimed in claim 19, wherein the composing of the plurality of ideal input signals comprises:
  selecting the level values according to the pre-defined binary signals so as to compose the plurality of ideal input signals.

22. The signal quality estimating method as claimed in claim 19, wherein the obtaining of the quality of the input signal comprises:
  summing squares of differences between the plurality of ideal input signals; and
  outputting the sum as the quality of the input signal.

23. The signal quality estimating method as claimed in claim 19, wherein the obtaining of the quality of the input signal comprises:
  calculating a square root of a sum of squares of differences between the plurality of ideal input signals; and
  outputting the square root as the quality of the input signal.

24. The signal quality estimating method as claimed in claim 19, wherein the obtaining of the quality of the input signal comprises:
  dividing, by an amplitude of the input signal, a square root of a sum of squares of differences between the plurality of ideal input signals; and
  outputting a result of the dividing as the quality of the input signal.

25. The signal quality estimating method as claimed in claim 19, wherein the obtaining of the quality of the input signal comprises calculating an LSNR using the input signal and the binary signal such that a higher value of the LSNR corresponds to a better signal quality.

26. The signal quality estimating method as claimed in claim 25, wherein the obtaining of the quality of the input signal further comprises:
  performing an arithmetic operation on the calculated LSNR and the calculation between the plurality of ideal input signals.

27. The signal quality estimating method as claimed in claim 25, wherein the obtaining of the quality of the input signal further comprises:
  performing an arithmetic operation on a result of a normalization of the LSNR to an amplitude of the input signal with the calculation between the plurality of ideal input signals.

28. The signal quality estimating method as claimed in claim 19, wherein the obtaining of the quality of the input signal comprises:
  performing an equation:

$$\text{New parameter} = \frac{10\log_{10}(\sum \text{distance})}{\sum \text{noise signal}^2}$$

where the distance corresponds to a distance between two ideal input signals.

29. A computer-readable recording medium encoded with the method of claim 19 and implemented by a computer.

* * * * *